July 14, 1959   M. A. RIKARD ET AL   2,894,820
METHOD OF PRODUCING AGGLOMERATED LIME HYDRATE
Filed Jan. 2, 1953   5 Sheets-Sheet 1

FIG. 1

Inventors
MACK A. RIKARD
EUGENE A. BARTLETT
ROBERT B. COLEMAN
By A. Yates Dowell
Attorney

FIG. 2

July 14, 1959     M. A. RIKARD ET AL     2,894,820
METHOD OF PRODUCING AGGLOMERATED LIME HYDRATE

INVENTORS
MACK A. RIKARD
EUGENE A. BARTLETT
ROBERT B. COLEMAN
BY
ATTORNEY

July 14, 1959

M. A. RIKARD ET AL 2,894,820

METHOD OF PRODUCING AGGLOMERATED LIME HYDRATE

Filed Jan. 2, 1953

INVENTORS
MACK A. RIKARD
EUGENE A. BARTLETT
ROBERT B. COLEMAN

BY *A. Yates Dowell*

ATTORNEY

United States Patent Office 2,894,820
Patented July 14, 1959

2,894,820

METHOD OF PRODUCING AGGLOMERATED LIME HYDRATE

Mack Albert Rikard, Eugene Aiken Bartlett, and Robert Boisseau Coleman, Jr., Birmingham, Ala., assignors, by mesne assignments, to American-Marietta Company, Chicago, Ill., a corporation of Illinois Application January 2, 1953, Serial No. 329,238

2 Claims. (Cl. 23—188)

This invention relates to the production of agglomerated lime hydrates particularly useful for finish coat plaster or for brick mortar, to methods of making such hydrates, and to novel products and compositions resulting therefrom, having desirable physical properties of particular value in the construction field.

The conventional or normal process for producing hydrated lime makes a product which consists essentially of a large number of discrete particles in the size range from 0.5 to 5 microns, a few particles in the size range of 5 to 44 microns, and a variable amount coarser than 44 microns. The particle size distribution of the subsieve fraction of such a conventional hydrate is shown in Table 1. The surface area of this particular hydrate as determined by the nitrogen adsorption method is 16.9 square meters per gram. This is typical of conventional hydrated limes, many of which have surface areas of the order of 13 to 18 sq. m./g., and indicates an extreme fineness of subdivision.

Current specifications for hydrated lime recognize two types of this material for structural purposes, namely mason's hydrated and finishing hydrated lime. The differentiation between mason's hydrated and finishing hydrated lime in these specifications is usually based upon plasticity, as measured by the Emley Plasticimeter (A.S.T.M. designation C110–49), and the common requirement is that finishing hydrated limes have a plasticity figure after soaking 16 to 24 hours of at least 200. The normal mason's hydrate is not required to have a minimum plasticity figure. In addition to the differentiation between mason's hydrated and finishing hydrated lime, each of these in turn is divided into two sub-classes; the so-called type N hydrates and the type S hydrates. The current specifications pertaining to the several types of lime are:

Finishing Hydrated lime—type N—ASTM designation C6–49

Fnishing hydrated lime—type S—ASTM designation C206–49

Mason's hydrated lime—Types N and S—ASTM designation C207–49

Finishing and mason's hydrates—types N and S—Federal Specification S.S.L. 351

Type N mason's hydrate has no specification requirement either as to degree of oxide hydration or as to minimum plasticity figure. This is the normal mason's hydrate and it may be either high calcium hydrated lime, consisting essentially of calcium hydroxide, or it may be dolomitic hydrate lime, consisting of calcium hydroxide associated with a lesser amount of magnesium oxide.

The type S mason's hydrate is required by specifications to have at least 92 percent of the oxides hydrated and to have a minimum plasticity figure of 200 when tested within 30 minutes after wetting.

The specification requirements for type N finishing hydrated lime do not involve any chemical requirements different from type N mason's hydrate, but do require that the hydrate after soaking 16 to 24 hours shall have a minimum plasticity figure of 200. The type S finishing hydrated lime is required to have at least 92 percent of the oxides hydrated and to have a minimum plasticity figure of 200 after soaking for a period not exceeding 24 hours. It is understood, of course, that while there is no specification requirement for color or for soaking characteristics of hydrated lime, these are important characteristics in practical differentiation of finishing hydrated lime from mason's hydrated lime.

The conventional mason's hydrated lime, is normally not plastic. It may be eminently suitable for chemical or agricultural uses, but it does not have the workability or plasticity characteristics desired by the plasterer or the bricklayer. The conventional hydrate has a plasticity figure as determined on the Emley Plasticimeter, ranging from 100 to 150.

In the production of conventional hydrated lime (type N mason's and type N finishing), quick lime and water are mixed together in the correct proportions so that after the chemical reaction is complete and the excess water is driven off as steam, a finely divided dry product is obtained. This product consists essentially of calcium hydroxide, when derived from a high calcium quick lime, or a calcium hydroxide plus lesser amounts of magnesium oxide and/or hydroxide when derived from a dolomitic quick lime, but usually contains impurities derived from the original stone from which the quick lime was made or may contain particles of over-burned or under-burned quick lime which have not properly hydrated. In this hydrating process the crude hydrate is passed to a classifier which separates the finely divided hydrated lime from the coarse particles and impurities.

The objective of manufacturers operating under the conventional process is to produce the maximum amount of fines and the minimum amount of "tails" (i.e. coarse particles), since it is normally considered that these tails are of no value or at least are of little value as contrasted to the fines fraction. By using finely ground quick lime and a minimum amount of water, these tails may be held to reasonable amounts, such as 5 to 15 percent and many manufacturers, after separating these tails, throw them away or sell them at a low price as an agricultural product because they do contain a preponderance of impurities or of improperly burned lime derived from the original quick lime.

Type S limes (mason's and finishing) are currently being produced from dolomitic quick limes by patented pressure hydrating processes; the Warner process, U.S. Patent No. 2,365,736, which normally employs 5–30 lbs. per sq. in. steam pressure, whereas, the Corson process, U.S. Patent No. 2,409,546, employs considerably higher pressures. To date, insofar as known, these processes have not been adapted to the production of either mason's or finishing hydrates from high-calcium quick lime.

The purpose of these pressure hydrating processes is to accelerate the hydration of the magnesium oxide, Magnesium oxide is not readily hydrated by the conventional methods used to produce type N hydrates.

One of the objectives of the present invention is the production of a highly plastic lime eminently suitable for finish coat plaster or for brick mortar.

Other objectives include the production of hydrated limes which are identical chemically with conventional lime hydrates but in which the individual particles with sizes of 0.5 to 5 microns are clumped or agglomerated into larger particles, the majority of the lime being in the form of agglomerates in the size range from 5 to 44 microns.

Still further objectives of the present invention include the production of lime hydrates of improved workability and "feel" to the artisan.

Still further objectives include improved methods of producing such products and the resulting products themselves.

Further objectives and advantages of this invention will appear from the more detailed description set forth below, it being understood that such more detailed description is given by way of illustration and explanation only, and not by way of limitation, since various changes therein may be made by those skilled in the art without departing from the scope and spirit of the present invention.

In connection with that more detailed description there is shown in the accompanying drawing in Figure 1, a photomicrograph of a conventional lime hydrate.

In accordance with the present invention, highly plastic hydrated lime is produced eminently suitable for use in the construction field. These lime hydrates are characterized by larger particles each one of which is composed of large numbers of fine particles which are clustered together. Thus discrete particles of less than about 5 microns in size are clustered into aggregates essentially in the size range of about 5 to 44 microns. Although chemically identical with conventional lime hydrates, the physical characteristics give the lime hydrates of the present invention high plasticity, and products testing in excess of 200 on the Emley Plasticimeter may be readily produced.

Figure 1:
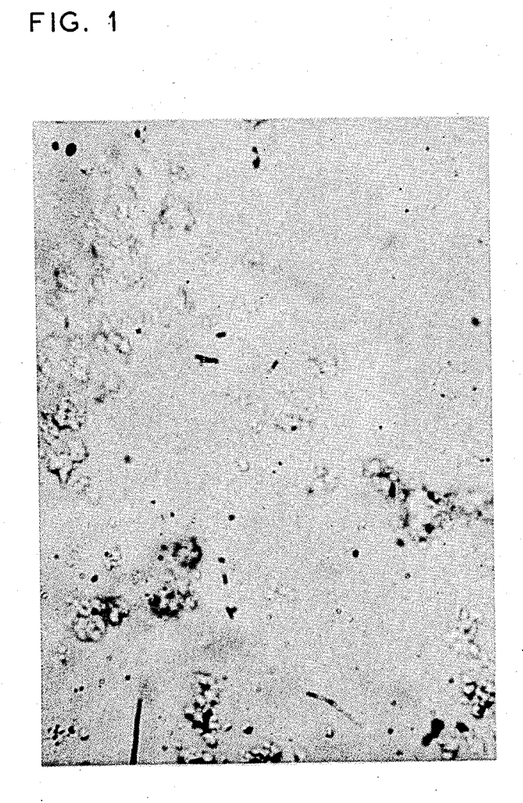
Figure 2:
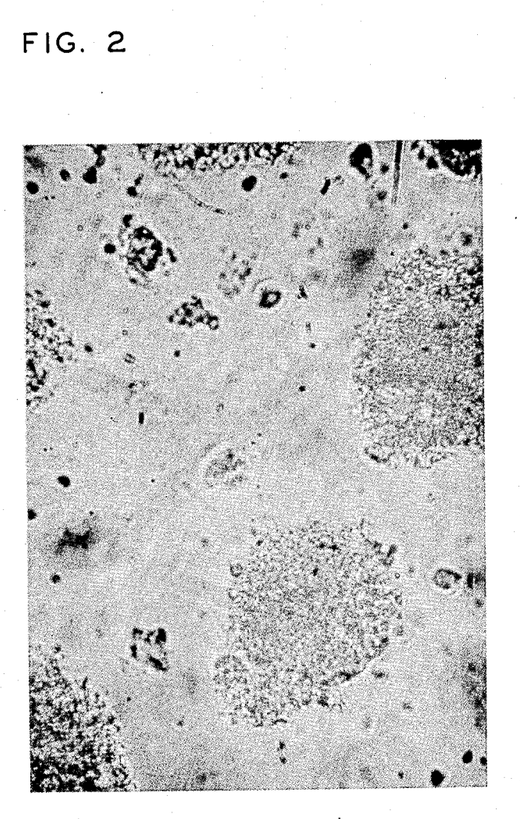
in Figure 2, a photomicrograph of an agglomerated lime hydrate produced in accordance with the present invention.
Figure 7:
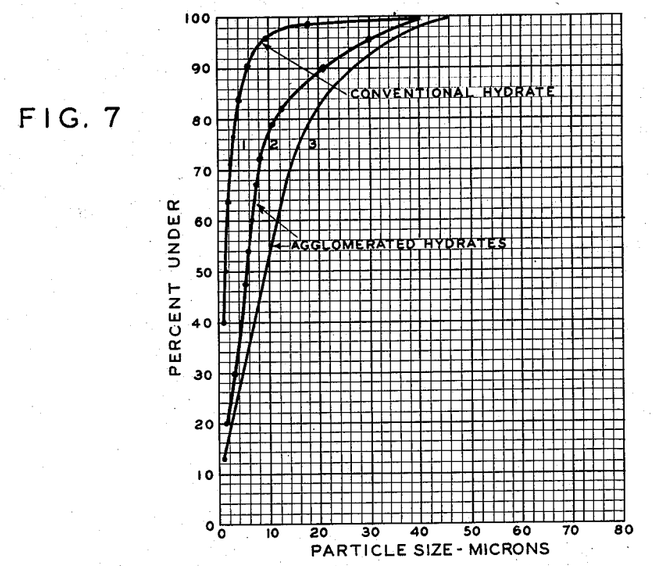
in Figure 7, graphs showing particle size distribution in conventional and agglomerated hydrated lime products produced in accordance with the present invention; and in Figure 8, a graph relating plasticity to water content.

Figure 1 is a photomicrograph of a conventional hydrate and may be compared with Figure 2 which is a photomicrograph of a typical agglomerated hydrate produced in accordance with the present invention. The particle size distribution of the sub-sieve fraction of a conventional hydrate is shown below in Table No. 1, sample No. 1, while the particle size distribution of two agglomerated hydrated limes produced by the present invention are also shown in Table No. 1, samples Nos. 2 and 3. These data are plotted on the graphs of Figure 7, as graphs Nos. 1, 2 and 3 respectively.

TABLE 1

*Sub-sieve grain size of hydrated lime samples determined by Andreasen pipette method*

| Grain size microns | Conventional | Agglomerated | |
|---|---|---|---|
| | Sample No. 1 | Sample No. 2 | Sample No. 3 |
| Less than: | | | |
| 44.0 | 100.0 | 100.0 | 100.0 |
| 39.0 | 99.5 | 99.6 | 99.5 |
| 17.5 | 99.0 | 84.3 | 78.4 |
| 12.0 | 97.0 | 75.5 | 59.0 |
| 8.5 | 95.8 | 65.5 | 45.5 |
| 6.0 | 91.0 | 52.4 | 32.6 |
| 5.0 | 87.0 | 47.0 | 31.8 |
| 4.0 | 82.4 | 41.0 | 27.0 |
| 3.0 | 81.0 | 36.2 | 24.8 |
| 2.0 | 64.1 | 28.5 | 17.9 |
| 1.0 | 40.2 | 18.7 | 13.4 |
| Percent Water [1] | 0.2 | 20 | 33 |
| Emley Plasticity Index | 138 | 475 | 427 |

[1] Percent water in hydrate before drying and crushing.

It is interesting to note that the agglomerates of the present invention, being composed of many small particles more or less loosely clustered together, do not have the same characteristics as a single large particle might be expected to have. This is particularly evident from the surface area of these hydrates as determined by the nitrogen adsorption method of Brunauer, Emmet, and Teller. By this method it is found that the conventional hydrate illustrated in Fig. 1, has a surface area of 16.9 square meters per gram. This is typical of conventional hydrated limes, and indicates an extreme fineness of subdivision. However, the surface area of the agglomerated material illustrated in Fig. 2 is not less than that of the non-agglomerated material, as would normally be expected, but is almost 50 percent higher, being 22.8 square meters per gram. This indicates that the agglomerated material is composed primarily of individual particles which are fundamentally smaller than those contained in the non-agglomerated conventional hydrates shown in Fig. 1, but that they are grouped or clustered together to form agglomerates ranging in size from 5 to 44 microns. It should be noted, however, that the present invention does not produce a coarse hydrate in the conventional sense as would be judged by normal screen tests. The final product meets all of the requirements of ASTM and Federal Specifications for fineness of hydrated lime.

While highly plastic high calcium hydrated lime which meets the physical and chemical requirements of ASTM and Federal Specifications for type S hydrate is thus produced, the invention is equally adaptable to dolomitic limes and is not restricted to the production of high calcium hydrated lime.

The conventional hydrated lime, as illustrated in Fig. 1, is normally not plastic. It may be eminently suitable for chemical or agricultural uses, but it does not have the workability or plasticity characteristics desired by the plasterer or the bricklayer. The conventional hydrate, as illustrated by Fig. 1, has a plasticity figure, as determined by the Emley Plasticimeter, ranging from 100 to 150. The agglomerated hydrate, as illustrated in Fig. 2, has a plasticity figure ranging from 200 to 400.

The agglomerated hydrates of the present invention may be produced by various methods. It has been found that by operating with a well burned, selected quick lime of high purity, the process may be controlled so as to produce as much as 50 to 70 percent of oversize particles, as shown in Table No. 2.

TABLE 2

Rotary kiln, high-calcium quicklime 1½" x 1" hydrated by wet method to 10% moisture. Dried with auxiliary heat and air classified, which removed 65% of the classifier feed as agglomerates and 35% as fines. The sieve analyses on the two fractions were as follows:

| | Agglomerates | Fines |
|---|---|---|
| Percent passing: | | |
| No. 4 Sieve | 98 | 100 |
| No. 8 Sieve | 91 | 100 |
| No. 16 Sieve | 73 | 100 |
| No. 30 Sieve | 58 | 100 |
| No. 50 Sieve | 41 | 100 |
| No. 100 Sieve | 25 | 100 |
| No. 200 Sieve | 15 | 99.9 |
| No. 325 Sieve | 12 | 99.7 |

These oversize particles are not "tails" in the true sense, but are comprised of agglomerates considerably larger than those shown in Fig. 2. The oversize particles are separated from the undersize and are further processed by pulverizing by any conventional method, and when so processed, these particles, now fine by conventional screen tests, are highly plastic whereas the undersize fines produced and separated from the crude hydrate have relatively low plasticity.

Figure 3:
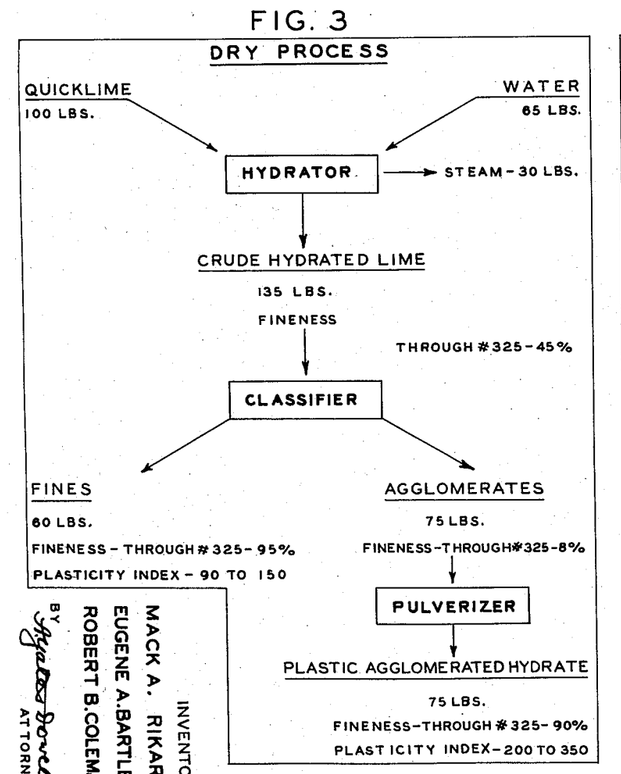
in Figure 3, a flow sheet indicating one method in accordance with the present invention termed the "Dry Process"

To illustrate various methods that may be used in carrying out this invention, the flow sheets are exemplary. Figure 3 is a flow sheet indicating one method herein termed the "Dry Process." In this method quick lime and water are proportioned in such amounts that the product leaving the hydrator is substantially dry. The size of the quick lime is not necessarily restricted, but a greater proportion of the desired end product is obtained if quick lime is used in the size of pebbles, say 1″ to 2″ rather than if used as crushed or ground quick lime substantially all of which will pass through a ¼″ screen.

Upon processing this quick lime and water in a conventional hydrator in such a manner that the lime leaving the hydrator contains approximately 3 percent free water before cooling, or less than 1 percent water after cooling, a product is obtained which upon classification in a conventional air classifier may be separated into two fractions.

The fine fraction will amount to approximately 50 percent of the total. It will contain from 0 to 10 percent material retained on a No. 325 sieve and will be eminently suitable for many uses, but it will not be plastic.

The agglomerated fraction, also mounting in tonnage to about 50 percent of the total, will contain relatively little material which will pass a No. 325 sieve, but will have many agglomerates ranging in size up to ¼″. This agglomerated product is the one used herein because it is the product from which plastic products are made. Upon passing this agglomerated product through a pulverizer, which may be of any one of the conventional types such as an impact pulverizer, a roll mill, a tube mill, or a ball mill, the desired finished product is obtained while still maintaining the particles in the agglomerated form, such as shown in Figure 2, rather than producing discrete individual particles such as shown in Fig. 1. A typical screen analysis of the finished product of the invention will show about 90% passing a No. 325 sieve.

Figure 4:
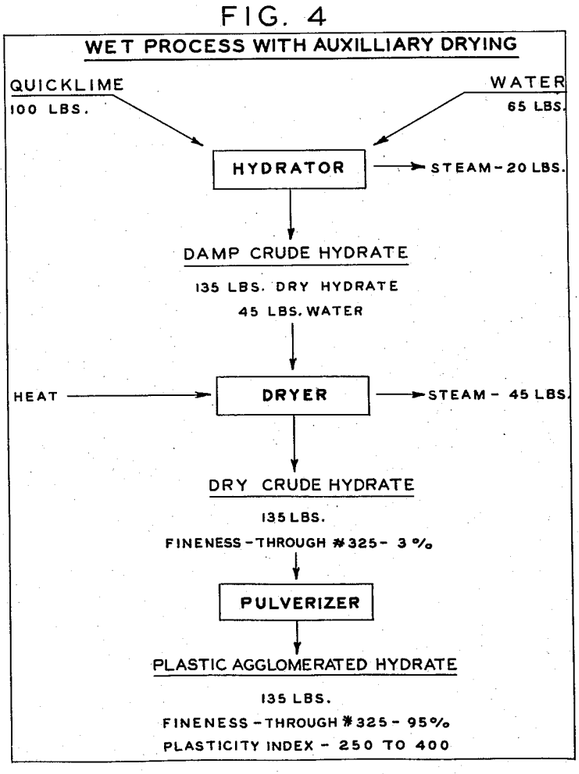
in Figure 4, a flow sheet indicating another method in accordance with the present invention denominated "Wet Process With Auxiliary Drying"

Figure 4 is a flow sheet showing a second method herein termed the "Wet Process With Auxiliary Drying." In this method quick lime and water are mixed substantially as in the dry process, but using an excess of water so that the hydrate leaving the hydrator contains free water after cooling in amounts ranging from 3 lbs. of water per 100 lbs. dry hydrate up to as much as 50 lbs. of water per 100 lbs. of dry hydrate.

Figure 8:
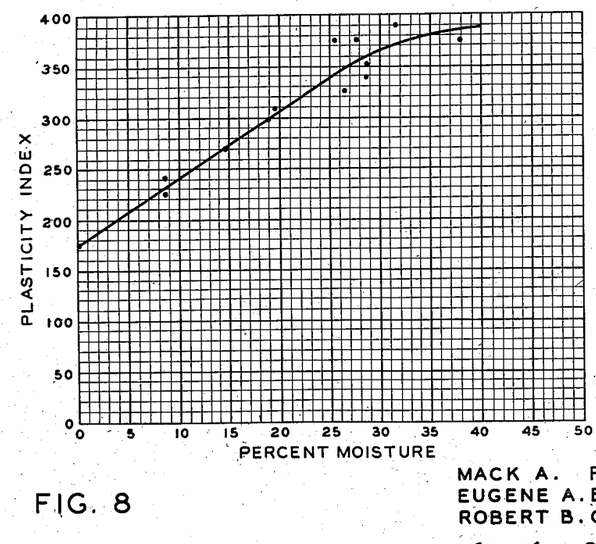

The plasticity of the finished product is steadily improved as the amount of water is increased from the lower value to a value of about 35 percent free water, as shown on the graph of Figure 8. Beyond 35 percent free water there seems to be no continued improvement in the plasticity of the finished product, but there is no decrease in quality through the presence of amounts in excess of 35 percent.

This damp material is then dried by any conventional method and when so dried it produces a product, a large preponderance of which is in an agglomerated form. After drying, the product is pulverized by any conventional process, such as heretofore described, and when so pulverized results in the desired finished products while maintaining the particles in the agglomerated form. The wet process produces substantially more agglomerates than the dry process and up to 100 percent of the crude hydrate in the wet process may be produced in plastic form whereas in the dry process only about 50 percent of the crude hydrate is recoverable in the plastic form.

Figure 5:
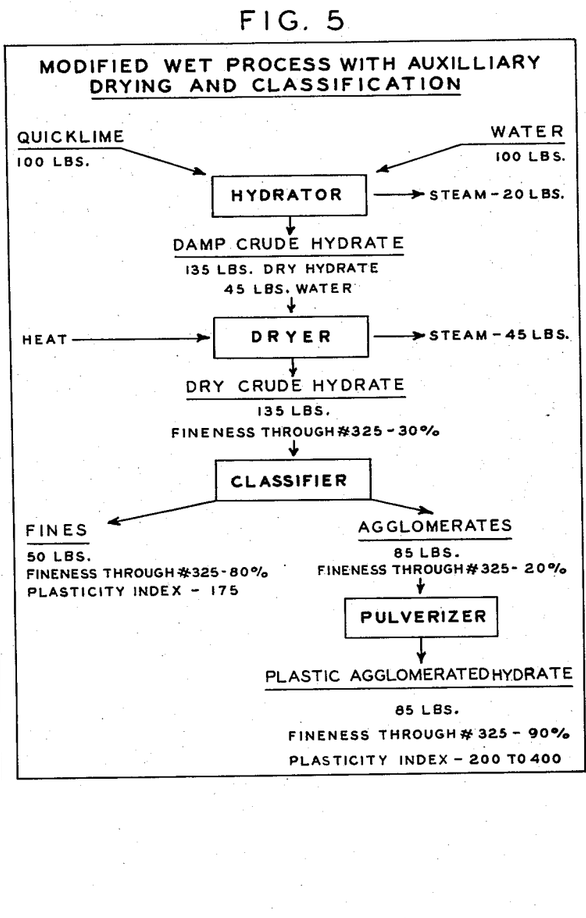
in Figure 5, a flow sheet of a further method in accordance with the present invention denominated "Modified Wet Process With Auxiliary Drying and Classification"

A third method of producing agglomerates is the wet process, described above, except that subsequent to drying and prior to final pulverizing of the hydrate, a classification step is introduced whereby some of the fines are removed by conventional methods. The fines removed by this additional step constitute the least plastic fraction of the total. By their removal there is produced a final product which is more plastic than the product produced by the wet process shown in Fig. 4. A flow sheet of this method is shown in Fig. 5.

Figure 6:
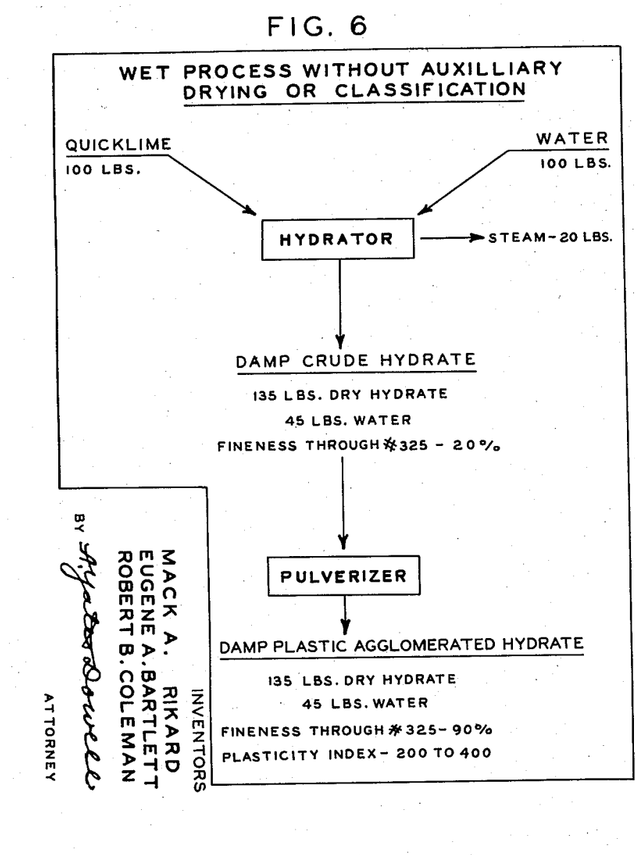
in Figure 6, a flow sheet of a further method in accordance with the present invention denominated "Wet Process Without Auxiliary Drying or Classification"

A fourth method of producing agglomerates is as follows: quick lime is hydrated with an excess of water as described in the second method above to produce a hydrate containing from 3 to 50 percent free water, then this hydrate without drying is ground and may be marketed either as such in the damp condition or with the addition of more water as a putty. A flow sheet of this method is shown in Fig. 6.

It will be seen from the above that the invention consists essentially of producing agglomerated particles in the range of 5 to 44 microns which are desirable constituents of plastic hydrates and that these may be obtained by various alternate methods of producing large percentages of these agglomerates by novel changes in the conventional manufacturing process.

EXAMPLE 1

The following example illustrates the application of the dry process shown in Fig. 3 to a high calcium rotary kiln pebble quick lime. The analysis of the quick lime and its calculated compositions were as follows:

| Quick lime analysis: | Percent |
|---|---|
| Insoluble matter | 0.69 |
| Magnesium oxide | 1.82 |
| Calcium oxide | 96.03 |
| Carbon dioxide | 0.56 |
| Combined water | 0.90 |

| Calculated composition: | Percent |
|---|---|
| Insoluble matter | 0.69 |
| Magnesium oxide | 1.82 |
| Calcium Hydroxide | 3.70 |
| Calcium carbonate | 1.27 |
| Free calcium oxide | 92.52 |

100 parts of this quick lime in the form of pebbles passing a 1 inch sieve and retained on a ½-inch sieve were treated with about 65 parts of water. After the hydration process was complete, 135 parts of hydrated lime containing no free water were obtained. A portion of this hydrate was passed through an impact pulverizer without preliminary separation into fine and coarse fractions. This portion had the following chemical and physical properties.

| Hydrate analysis: | Percent |
|---|---|
| Insoluble matter | 0.60 |
| Magnesium oxide | 1.72 |
| Calcium oxide | 72.88 |
| Carbon dioxide | 1.05 |
| Combined water | 23.67 |

Calculated composition: Percent
- Insoluble matter __________________ 0.60
- Calcium carbonate ________________ 2.39
- Calcium hydroxide ________________ 94.54
- Magnesium oxide __________________ 0.17
- Magnesium hydroxide ______________ 2.22

Physical properties:
- Passing a No. 325 sieve __________percent__ 95.2
- Emley plasticity index ____________ 185

The balance of the hydrate was passed through a classifier as shown in Fig. 3. 66.7% of the classifier feed was recovered as fines, while 33.3% of the classifier feed was recovered as agglomerates. The tests on the fine products are:

Fines analysis: Percent
- Insoluble analysis ________________ 0.72
- Magnesium oxide __________________ 1.95
- Calcium oxide ____________________ 72.84
- Carbon dioxide ___________________ 0.41
- Combined water ___________________ 23.95

Calculated composition: Percent
- Insoluble matter __________________ 0.72
- Calcium carbonate ________________ 0.93
- Calcium hydroxide ________________ 95.57
- Magnesium oxide __________________ 0.35
- Magnesium hydroxide ______________ 2.30

Physical properties:
- Passing a No. 325 sieve __________percent__ 99.0
- Emley plasticity index ____________ 135

The agglomerated coarse fraction, representing one-third of the total production, was passed through an impact pulverizer, thereby producing the desired plastic agglomerated hydrate with the following characteristics:

Analysis: Percent
- Insoluble matter __________________ 0.70
- Magnesium oxide __________________ 1.14
- Calcium oxide ____________________ 73.11
- Carbon dioxide ___________________ 1.49
- Combined water ___________________ 23.39

Calculated composition: Percent
- Insoluble matter __________________ 0.70
- Calcium carbonate ________________ 3.39
- Calcium hydroxide ________________ 94.09
- Magnesium oxide __________________ 0.00
- Magnesium hydroxide ______________ 1.65

Physical properties:
- Passing a No. 325 sieve __________percent__ 90.0
- Emley plasticity index ____________ 273

EXAMPLE 2

This example illustrates the application of the wet process, with auxiliary drying, to quick lime of the same analysis and size range used in Example 1. 100 parts of this quick lime were hydrated with approximately 100 parts of water thereby producing 180 parts of damp crude hydrate containing 135 parts solids and 45 parts free water. After drying with auxiliary heat to remove the free water, the dried product was ground in an impact pulverizer, producing 135 parts of plastic agglomerated hydrate with the following characteristics:

Analysis: Percent
- Insoluble matter __________________ 0.52
- Magnesium oxide __________________ 1.38
- Calcium oxide ____________________ 72.60
- Carbon dioxide ___________________ 2.43
- Combined water ___________________ 22.96

Calculated composition: Percent
- Insoluble matter __________________ 0.52
- Calcium carbonate ________________ 5.52
- Calcium hydroxide ________________ 91.85
- Magnesium oxide __________________ 0.00
- Magnesium hydroxide ______________ 2.00

Physical properties:
- Passing a No. 325 sieve __________percent__ 91.9
- Emley plasticity index ____________ 264

EXAMPLE 3

This example illustrates the application of the modified wet process, with auxiliary drying and classification, to quick lime of the same analysis and size range used in Example 1. 100 parts of this quick lime were hydrated with approximately 100 parts of water and the resulting damp hydrate was dried with auxiliary heat. At this stage the product was identical with that in Example 2 except that it was not pulverized. The dried product was passed through a classifier which removed 17% of the total classifier feed as fines with the following characteristics:

Analysis: Percent
- Insoluble matter __________________ 0.64
- Magnesium oxide __________________ 1.21
- Calcium oxide ____________________ 73.58
- Carbon dioxide ___________________ 1.79
- Combined water ___________________ 22.91

Calculated composition: Percent
- Insoluble matter __________________ 0.64
- Calcium carbonate ________________ 4.07
- Calcium hydroxide ________________ 94.20
- Magnesium oxide __________________ 1.22
- Magnesium hydroxide ______________ 0.00

Physical properties:
- Passing a No. 325 sieve __________percent__ 92.0
- Emley plasticity index ____________ 90

83% of the classifier feed was recovered as agglomerates which, after passing through the impact pulverizer had the following characteristics:

Analysis: Percent
- Insoluble matter __________________ 0.44
- Magnesium oxide __________________ 1.51
- Calcium oxide ____________________ 72.53
- Carbon dioxide ___________________ 2.61
- Combined water ___________________ 22.69

Calculated composition: Percent
- Insoluble matter __________________ 0.44
- Calcium carbonate ________________ 5.94
- Calcium hydroxide ________________ 91.44
- Magnesium oxide __________________ 0.48
- Magnesium hydroxide ______________ 1.48

Physical properties:
- Passing a No. 325 sieve __________percent__ 94.5
- Emley plasticity index ____________ 344

EXAMPLE 4

This example illustrates the application of the modified wet process, with auxiliary drying and classification, to another high-calcium quick lime. This quick lime was prepared in a shaft kiln and was crushed to a ½″ by ¼″ size. One hundred parts of this quick lime were hydrated with approximately one hundred parts of water and the resulting damp hydrate (28% moisture) was dried with auxiliary heat. The dried hydrate was passed through a classifier which removed 20.5% of the total classifier feed as fines with the following characteristics:

Analysis: Percent
- Insoluble matter ______________________ 0.24
- R₂O₃ __________________________________ 0.20
- Magnesium oxide ______________________ 0.86
- Calcium oxide ________________________ 72.45
- Carbon dioxide _______________________ 1.23
- Combined water _______________________ 22.80
- Free water ___________________________ 1.70

Calculated composition: Percent
- Insoluble matter ______________________ 0.24
- R₂O₃ __________________________________ 0.20
- Calcium carbonate ____________________ 2.79
- Calcium hydroxide ____________________ 93.60
- Magnesium oxide ______________________ 0.83
- Free water ___________________________ 1.70
- Magnesium hydroxide __________________ 0.12

Physical properties:
- Passing a No. 325 sieve __________percent__ 99.2
- Emley plasticity index ______________________ 96

79.5% of the classifier feed was recovered as agglomerates, which, after passing through the impact pulverizer had the following characteristics:

Analysis: Percent
- Insoluble matter ______________________ 0.36
- R₂O₃ __________________________________ 0.20
- Magnesium oxide ______________________ 0.72
- Calcium oxide ________________________ 72.65
- Carbon dioxide _______________________ 1.08
- Combined water _______________________ 24.90
- Free water ___________________________ 1.43

Calculated composition: Percent
- Insoluble matter ______________________ 0.36
- R₂O₃ __________________________________ 0.20
- Calcium carbonate ____________________ 2.45
- Calcium hydroxide ____________________ 94.10
- Magnesium oxide ______________________ 0.00
- Free water ___________________________ 1.43
- Magnesium hydroxide __________________ 1.04
- Excess combined water ________________ 1.76

Physical properties:
- Passing a No. 325 sieve __________percent__ 84.7
- Emley plasticity index ______________________ 270

EXAMPLE 5

This example illustrates the application of the modified wet process, with auxiliary drying and classification, to a second brand of shaft kiln high-calcium quick lime. This quick lime had been crushed to all passing a ½" sieve. One hundred parts of this quick lime were hydrated with approximately ninety parts of water and the resulting damp hydrate (16% moisture) was dried with auxiliary heat. The dried product was passed through a classifier which removed 42% of the total classifier feed as fines with the following characteristics:

Analysis: Percent
- Insoluble matter ______________________ 0.32
- Magnesium oxide ______________________ 0.31
- Calcium oxide ________________________ 72.90
- Carbon dioxide _______________________ 1.47
- Combined water _______________________ 22.85
- Free water ___________________________ 1.21

Calculated composition: Percent
- Insoluble matter ______________________ 0.32
- Calcium carbonate ____________________ 3.34
- Calcium hydroxide ____________________ 93.90
- Magnesium oxide ______________________ 0.21
- Free water ___________________________ 1.21
- Magnesium hydroxide __________________ 0.08

Physical properties:
- Passing a No. 325 sieve __________percent__ 99.3
- Emley plasticity index ______________________ 103

58% of the classifier feed was recovered as agglomerates which, after passing through the impact pulverizer, had the following characteristics:

Analysis: Percent
- Insoluble matter ______________________ 0.32
- Magnesium oxide ______________________ 0.30
- Calcium oxide ________________________ 73.10
- Carbon dioxide _______________________ 1.47
- Combined water _______________________ 22.90
- Free water ___________________________ 0.97

Calculated composition: Percent
- Insoluble matter ______________________ 0.32
- Calcium carbonate ____________________ 3.34
- Calcium hydroxide ____________________ 94.13
- Magnesium oxide ______________________ 0.26
- Free water ___________________________ 0.97
- Magnesium hydroxide __________________ 0.00

Physical properties:
- Passing a No. 325 sieve __________percent__ 90
- Emley plasticity index ______________________ 200

Several of the above examples are based upon a lime having high chemical purity and consequently a low amount of insoluble residue. Many commercial quick limes may have a larger amount of insoluble residue in the form of particles of flint, cherts or other extraneous substances and these particles are frequently removed as the so-called "tails" in the conventional hydration process.

In the present process of deliberately producing agglomerates and separating from these agglomerates the fine non-plastic fraction, these tails would stay with the agglomerates and if used in finished coat plaster might give a gritty feeling under the trowel. By introducing another classification of the agglomerates, the true tails which consist of the flint or chert particles above mentioned may be removed together with particles of unburned stone, overburned lime or other foreign material, from the agglomerates and thereby produce a material containing no gritty particles. It should be noted that the necessity for this step is contingent upon the nature and amount of the impurities or true tails in the particular hydrate; and in the case of a good grade of selected quick lime, it is not necessary that this supplemental classification step be included in the process.

EXAMPLE 6

The following example illustrates the application of the dry process shown in Figure 3 to a dolomitic quick lime. The analysis of the quick lime and its calculated composition were as follows:

Sieve analysis percent passing:
- 1½" sieve ___________________________________ 95.3
- 1" sieve ____________________________________ 76.2
- ¾" sieve ____________________________________ 42.8
- ½" sieve ____________________________________ 9.5
- ¼" sieve ____________________________________ 0.0

Quick lime analysis: Percent
- Insoluble matter ______________________ 3.54
- R₂O₃ __________________________________ 2.36
- Calcium oxide ________________________ 56.10
- Magnesium oxide ______________________ 36.80
- Carbon dioxide _______________________ 0.30
- Sulphur trioxide _____________________ Negl.
- Combined water _______________________ 1.01

Calculated composition: Percent
- Insoluble matter _________________________ 3.54
- $R_2O_3$ _________________________________ 2.36
- Magnesium oxide _________________________ 36.8
- Calcium hydroxide _______________________ 0.43
- Calcium carbonate _______________________ 0.68
- Calcium oxide ___________________________ 55.38

One hundred parts of this quick lime were treated with with about fifty-five parts of water. After the hydration process was complete, 125 parts of hydrated lime containing no free water were obtained. A portion of this hydrate was passed through an impact pulverizer without preliminary separation into fine and coarse fractions. This portion had the following chemical and physical properties.

Hydrate analysis: Percent
- Insoluble matter _________________________ 2.99
- $R_2O_3$ _________________________________ 1.72
- Magnesium oxide _________________________ 29.30
- Calcium oxide ___________________________ 45.00
- Carbon dioxide __________________________ 1.30
- Combined water __________________________ 19.48

Calculated composition: Percent
- Insoluble matter _________________________ 2.99
- $R_2O_3$ _________________________________ 1.72
- Calcium carbonate _______________________ 2.96
- Calcium hydroxide _______________________ 57.00
- Magnesium oxide _________________________ 16.80
- Magnesium hydroxide _____________________ 18.00

Physical properties:
- Passing a No. 200 sieve __________ percent__ 95.6
- Passing a No. 325 sieve __________ do____ 91.5
- Emley plasticity index _____________________ 248

The balance of the hydrate was passed through a classifier. 64.8% of the classifier feed was recovered as fines, while 35.2% of the classifier feed was recovered as agglomerates. The tests on the fine products are:

Fines analysis: Percent
- Insoluble matter _________________________ 2.76
- $R_2O_3$ _________________________________ 1.72
- Magnesium oxide _________________________ 29.60
- Calcium oxide ___________________________ 45.50
- Carbon dioxide __________________________ 1.34
- Combined water __________________________ 18.78

Calculated composition: Percent
- Insoluble matter _________________________ 2.76
- $R_2O_3$ _________________________________ 1.72
- Calcium carbonate _______________________ 3.05
- Calcium hydroxide _______________________ 58.00
- Magnesium hydroxide _____________________ 19.10
- Magnesium oxide _________________________ 15.20

Physical properties:
- Passing a No. 200 sieve __________ percent__ 60.2
- Passing a No. 325 sieve __________ do____ 53.6
- Emley plasticity index _____________________ 78

The agglomerated coarse fraction, representing one-third of the total production, was passed through an impact pulverizer, thereby producing the desired plastic agglomerated hydrate with the following characteristics:

Analysis: Percent
- Insoluble matter _________________________ 3.42
- $R_2O_3$ _________________________________ 1.72
- Calcium oxide ___________________________ 44.00
- Magnesium oxide _________________________ 28.65
- Carbon dioxide __________________________ 1.23
- Combined water __________________________ 20.98

Calculated composition: Percent
- Insoluble matter _________________________ 3.42
- $R_2O_3$ _________________________________ 1.72
- Calcium carbonate _______________________ 2.80
- Calcium hydroxide _______________________ 56.00
- Magnesium hydroxide _____________________ 23.90
- Magnesium oxide _________________________ 12.10

Physical properties:
- Passing a No. 200 sieve __________ percent__ 95.8
- Passing a No. 325 sieve __________ do____ 91.0
- Emley plasticity index _____________________ 284

EXAMPLE 7

This example illustrates the application of the wet process, with auxiliary drying to dolomitic quick lime on the same analysis and size range used in Example 6. One hundred parts of this quick lime were hydrated with approximately 85 parts of water thereby producing 171 parts of damp crude hydrate containing 126.5 parts solids and 45.5 parts free water. After drying with auxiliary heat to remove the free water, the dried product was ground in an impact pulverizer, producing 125.5 parts of plastic agglomerated hydrate with the following characteristics:

Analysis: Percent
- Insoluble matter _________________________ 2.86
- $R_2O_3$ _________________________________ 1.47
- Calcium oxide ___________________________ 44.40
- Magnesium oxide _________________________ 28.50
- Carbon dioxide __________________________ 3.18
- Combined water __________________________ 19.52

Calculated composition: Percent
- Insoluble matter _________________________ 2.86
- $R_2O_3$ _________________________________ 1.47
- Calcium carbonate _______________________ 7.23
- Calcium hydroxide _______________________ 53.30
- Magnesium hydroxide _____________________ 22.70
- Magnesium oxide _________________________ 12.79

Physical properties:
- Passing a No. 200 sieve _______ Percent __ 95.0
- Passing a No. 325 sieve __________ do____ 91.0
- Emley plasticity index _____________________ 278

EXAMPLE 8

This example illustrates the application of the modified wet process, with auxiliary drying and classification, to dolomitic quick lime of the same analysis and size range used in Example 6. One hundred parts of this quick lime were hydrated with approximately 85 parts of water and the resulting damp hydrate was dried with auxiliary heat. At this stage the product was identical with that in Example 7 except that it was not pulverized. The dried product was passed through a classifier which removed 57.3% of the total classifier feed as fines with the following characteristics:

Analysis: Percent
- Insoluble matter _________________________ 2.80
- $R_2O_3$ _________________________________ 1.38
- Calcium oxide ___________________________ 45.00
- Magnesium oxide _________________________ 28.40
- Carbon dioxide __________________________ 3.74

Calculated composition: Percent
- Insoluble matter _________________________ 2.80
- $R_2O_3$ _________________________________ 1.38
- Calcium carbonate _______________________ 8.50
- Calcium hydroxide _______________________ 53.20
- Magnesium hydroxide _____________________ 20.8
- Magnesium oxide _________________________ 14.0

Physical properties:
- Passing a No. 200 sieve __________ percent__ 49.7
- Passing a No. 325 sieve __________ do____ 47.9
- Emley plasticity index _____________________ 87

42.7% of the classifier was recoverd as agglomerates which, after passing through the impact pulverizer had the following characteristics:

Analysis: | Percent
--- | ---
Insoluble matter | 2.92
$R_2O_3$ | 1.60
Calcium oxide | 43.60
Magnesium oxide | 28.60
Carbon dioxide | 2.43

Calculated composition: | Percent
--- | ---
Insoluble matter | 2.92
$R_2O_3$ | 1.60
Calcium carbonate | 5.51
Calcium hydroxide | 53.50
Magnesium hydroxide | 25.20
Magnesium oxide | 11.2

Physical properties:

Passing a No. 200 sieve __________percent__ 96
Passing a No. 325 sieve __________do____ 90.3
Emley plasticity index __________________ 344

Having thus set forth our invention, we claim:

1. The method of producing an agglomerated lime hydrate, composed of discrete particles of less than 5 microns diameter which are clustered into agglomerates essentially in the size range of 5 to 44 microns, which consists of hydrating quick lime to produce a large proportion of agglomerates coarser than 44 microns in size, pulverizing said agglomerates so that substantially all of the pulverized product so produced will be finer than 44 microns, separating said pulverized product into two size fractions, one being a less plastic finer fraction and the other being a coarser fraction, rejecting the finer fraction, and pulverizing the coarser fraction to produce the desired agglomerated lime hydrate.

2. The method of claim 1 wherein the proportion coarser than 44 microns is increased by hydrating in such a manner that from 3 to 50% free moisture is contained in the hydrate as originally produced, drying the damp hydrate, separating the dried hydrate into two size fractions, one being a less plastic finer fraction and the other being a coarser fraction, the finer fraction is rejected and the coarser fraction is pulverized to produce the desired agglomerated hydrated lime.

References Cited in the file of this patent

UNITED STATES PATENTS

| | | |
|---|---|---|
| 721,871 | Eldred | Mar. 3, 1903 |
| 1,580,710 | Chubback | Apr. 13, 1926 |
| 1,613,341 | Carbon | Jan. 4, 1927 |
| 1,634,424 | Hunter | July 5, 1927 |
| 2,408,647 | Huntzicker et al. | Oct. 1, 1946 |
| 2,409,546 | Corson | Oct. 15, 1946 |
| 2,489,033 | Huntzicker | Nov. 22, 1949 |
| 2,565,930 | Rafton | Aug. 28, 1951 |